United States Patent
Seacat

(10) Patent No.: US 10,282,680 B2
(45) Date of Patent: May 7, 2019

(54) SURPRISE DESTINATION RIDESHARING

(71) Applicant: Kathy Seacat, Helena, MT (US)

(72) Inventor: Kathy Seacat, Helena, MT (US)

(73) Assignee: SplitTix LLC, Baltimore, MD (US)

( * ) Notice: Subject to any disclaimer, the term of this patent is extended or adjusted under 35 U.S.C. 154(b) by 133 days.

(21) Appl. No.: 15/393,623

(22) Filed: Dec. 29, 2016

(65) Prior Publication Data

US 2018/0189682 A1   Jul. 5, 2018

(51) Int. Cl.
*G01C 21/34* (2006.01)
*G06Q 10/02* (2012.01)
*G06Q 50/14* (2012.01)

(52) U.S. Cl.
CPC ......... *G06Q 10/02* (2013.01); *G01C 21/3438* (2013.01); *G06Q 50/14* (2013.01)

(58) Field of Classification Search
None
See application file for complete search history.

(56) References Cited

U.S. PATENT DOCUMENTS

| | | | |
|---|---|---|---|
| 2008/0195312 A1* | 8/2008 | Aaron ................. | G06Q 10/109 455/418 |
| 2009/0171559 A1* | 7/2009 | Lehtiniemi ............ | G01C 21/20 701/533 |
| 2014/0194198 A1 | 7/2014 | Gale et al. | |
| 2018/0033058 A1* | 2/2018 | Mukherjee ......... | G06Q 30/0282 |

* cited by examiner

Primary Examiner — Sunit Pandya

(57) ABSTRACT

A ridesharing with a surprise destination based on a reservation is disclosed. A user can request a ridesharing service for the reservation. The request may include a set of ridesharing preferences. The pickup location for the ridesharing service to pickup the user is determined along with a pickup time before the reservation time based on the ridesharing preferences. The system may request a ridesharing vehicle to pick the user at the pickup location and deliver the user to the surprise destination. Furthermore, a driver of the ridesharing vehicle may be instructed not to reveal the surprise destination. Furthermore, an application associated with the ridesharing may hide a set of revealing information for the reservation. Upon determining the ridesharing vehicle has reached the surprise destination based on the reservation, the reservation may be revealed. Furthermore, the ridesharing vehicle may pickup additional users.

18 Claims, 7 Drawing Sheets

SURPRISE DESTINATION RIDESHARING

BACKGROUND

The present invention relates to the field of ridesharing and, more particularly, to a ridesharing with a surprise destination based on a reservation.

Ridesharing is used to transport at least one passenger from a pickup location to at least one destination. Companies may offer either real-time or scheduled rideshares. Popular ridesharing services include, but are not limited to, Sidecar, Uber, Lyft, Wingz, EasyTaxi and Hailo. Most ridesharing providers offer a mobile application which allows passengers to book or reserve a rideshare through the app. The app may allow the passenger to track the rideshare vehicle before it arrives, showing details about the driver of the ridesharing vehicle, details about the vehicle such as the make, model, color, and license plate number, and even allow the passenger to follow the travel route along a map during the ride. Once the ridesharing vehicle reaches the final destination, the passenger may pay using the application and provide feedback on their experience. In some cities, self-driving cars have been deployed for ridesharing.

Passengers choose to use ridesharing services for a number of reasons. Many passengers might not own a car, they might be meeting up with a friend or family member who will drive them after the event, or they might wish to use ridesharing for the safety of themselves and others such as when they know they will be drinking alcohol. Often times the ridesharing destination is associated with a reservation. For example, the reservation may be to dinner, a movie, a sporting event, a play, a show, an opera, a school event, a musical, a party, a concert, or other event.

BRIEF SUMMARY

One aspect of the present invention can include a ridesharing with a surprise destination based on a reservation. The reservation may be associated with a first user requiring the ridesharing. The first user can identify a set of ridesharing preferences. For example, the first user may prefer to travel in a specific make of vehicle, model of vehicle, size of vehicle, color of vehicle, and may prefer to spend a certain amount of money on the ride. Additionally, the first user may have preferences for the type of driver of the vehicle such as male vs. female, other identifying characteristics, and whether they prefer a real driver vs. a self-driving car. Furthermore, the first user may set their pickup preferences for the rideshare such as from a home or work address, their real-time location, or a manually entered alternative location. Additionally, the first user may prefer to allow other passengers to ride with them or to ride alone. The preferences may also include how far before the reservation time the first user may wish to be picked up by the ridesharing service. The pickup location can be determined based on the set of ridesharing preferences. Additionally, the ridesharing service may request a ridesharing vehicle pick up the first user from the pickup location at a specified time before the reservation time. The ridesharing vehicle may then take the first user to the surprise destination based on the reservation.

Another aspect of the present invention can determine the pickup time before the reservation time based on an estimated travel time determined by estimating travel time between the pickup location and the surprise destination and a travel preference set by the first user. For example, the first user may wish to arrive at the destination ten minutes early incase unforseen delays occur or to prepare for the reservation. In yet another aspect of the present invention, the estimated travel time is adjusted based on real time travel and weather predictions. For example, if the weather has a high chance of snow, and in previous snowy weather travel times have increased, the pickup time will be adjusted accordingly. In yet another example, if real time travel services recognize an accident or other travel delay, the pickup time before the reservation can be adjusted accordingly or an alternative travel route may be taken by the ridesharing vehicle.

Yet another aspect of the present invention can include the driver of the ridesharing vehicle is instructed not to reveal the surprise destination. The instruction may be in the form of a notification within a ridesharing computer application, a phone call, or a notification through Short Message Service (SMS) messaging, to name a few. For example, the driver may see a message similar to the following, "This is a surprise for the passenger. Please do not reveal." Another aspect of the present invention can include a computer application associated with the ridesharing which hides a set of revealing information for the reservation. Revealing information for the reservation may include but is not limited to: the address of the reservation, the name of the event, the name of the establishment, the phone number, the social handles for the reservation, the website address for the reservation, the directions to arrive at the reservation, and the type of establishment. In another aspect of the present invention, the computer application associated with the ridesharing may reveal the set of revealing information for the reservation upon arrival at the surprise destination. For example, upon arrival, the first user may be presented with a notification "You've arrived! Welcome to Dotty's Diner! We hope you enjoy your meal." In yet another embodiment, the set of revealing information may be revealed as a set of clues to the surprise destination while enroute.

Another aspect of the present invention can include a reminder before the pickup time. For example, the computer application associated with the ridesharing may show a notification reminding the first user of the reservation and suggest they schedule the ridesharing.

In another aspect of the present invention, the pickup location may be determined based on the first user's current real time location. The determination of the first user's real time location may be done using GPS technologies.

In yet another aspect of the present invention, the travel route for the ridesharing vehicle traveling from the pickup location to the surprise destination may include a detour to pickup a second passenger. The second passenger may or may not be familiar with the first user.

This summary is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed description.

DETAILED DESCRIPTION

Figure 1:
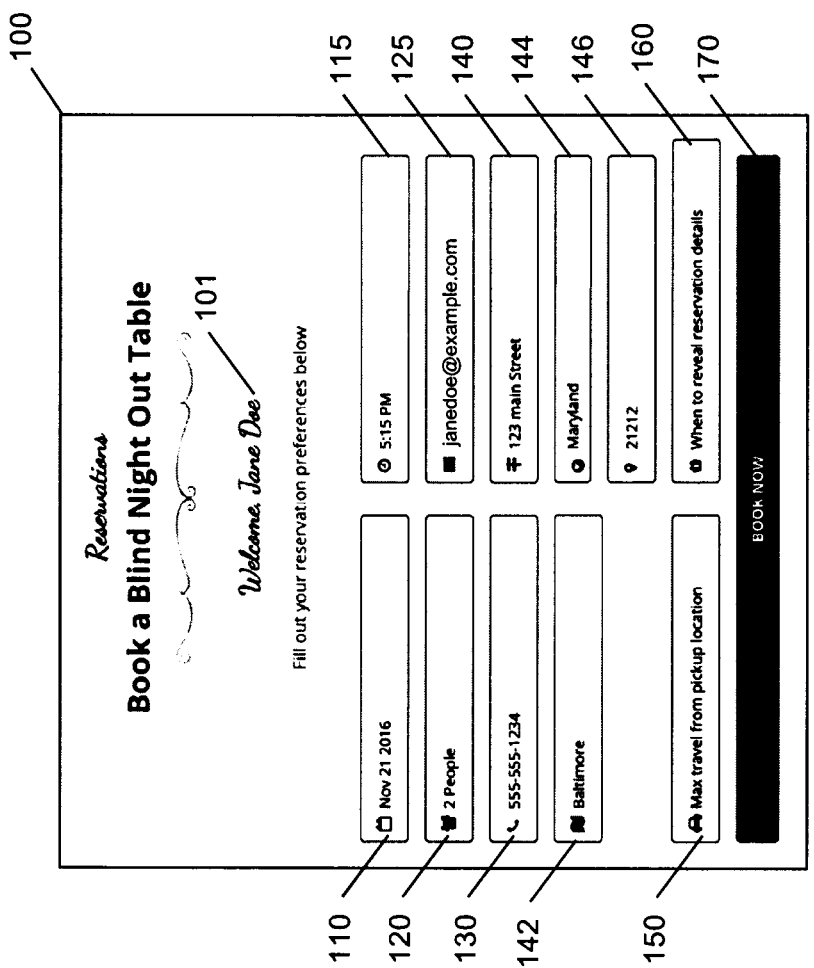
FIG. 1 is a schematic illustration of a reservation system (100) showing a set of reservation preferences in accordance with one embodiment.

The claimed subject matter may be embodied as a method, system, or computer program product. Accordingly, the claimed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the claimed subject matter may take the form of a computer program product on a computer-usable storage medium having computer-usable program code embodied in the medium. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency (RF), etc.

Any suitable computer-usable or computer-readable medium may be used. The computer-usable or computer-readable medium may be, for example but not limited to, an electronic, magnetic, optical, electromagnetic, infrared, or semiconductor system, apparatus, device, or propagation medium. Examples of a computer-readable medium include a semiconductor or solid state memory, magnetic tape, a removable computer diskette, a random access memory (RAM), a read-only memory (ROM), an erasable programmable read-only memory (EPROM or Flash memory, a rigid magnetic disk and an optical disk. Current examples of optical disks include compact disk-read only memory (CD-ROM), compact disk-read/write (CD-R/W) and DVD. Other computer-readable medium can include a transmission media, such as those supporting the Internet, an intranet, a personal area network (PAN), or a magnetic storage device. Transmission media can include an electrical connection having one or more wires, an optical fiber, an optical storage device, and a defined segment of the electromagnetic spectrum through which digitally encoded content is wirelessly conveyed using a carrier wave.

Note that the computer-usable or computer-readable medium can even include paper or another suitable medium upon which the program is printed, as the program can be electronically captured, for instance, via optical scanning of the paper or other medium, then compiled, interpreted, or otherwise processed in a suitable manner, if necessary, and then stored in a computer memory.

Computer program code for carrying out operations of the claimed subject matter can be written in an object oriented programming language such as Java, Smalltalk, C++ or the like. However, the computer program code for carrying out operations of the claimed subject matter may also be written in conventional procedural programming languages, such as the "C" programming language or similar programming languages. The program code may execute entirely on device, partly on a device, as a stand-alone software package, partly on the device and partly on a remote device or entirely on the remote device or server. In the latter scenario, the remote device may be connected to the device through a local area network (LAN) or a wide area network (WAN), or the connection may be made to an external device (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The claimed subject matter is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a schematic illustration of a reservation system (100) showing a set of reservation preferences in accordance with one embodiment. The reservation may be associated with a first user (101) and can include identifying information about the first user such as the first user's email address (125), phone number (120), street address (140), city (142), state (144), and zip code (146). Additionally, the reservation information can include a reservation time which may include a date (110) and time (115). The first user may indicate a maximum travel distance to the surprise destination (150). For example, if the max travel distance (150) is set to 1 mile, any chosen reservation destination would be within a one mile travel radius of the first user's pickup location and the surprise destination. In the example, any reservations outside of the maximum travel radius (150) would not be included as possible surprise destinations. The first user may indicate a reveal preference (160) such that the reservation can be a surprise destination to be revealed before the reservation time (115). For example, the reveal preference (160) might be 2 days before, 2 hours before, or never. In the example where the reveal preference (160) is set to never, the reservation destination remains a surprise until the first user arrives at the surprise destination. Once the first user is satisfied with the reservation preferences, the first user can book the reservation (170) within the reservation system.

Figure 2:
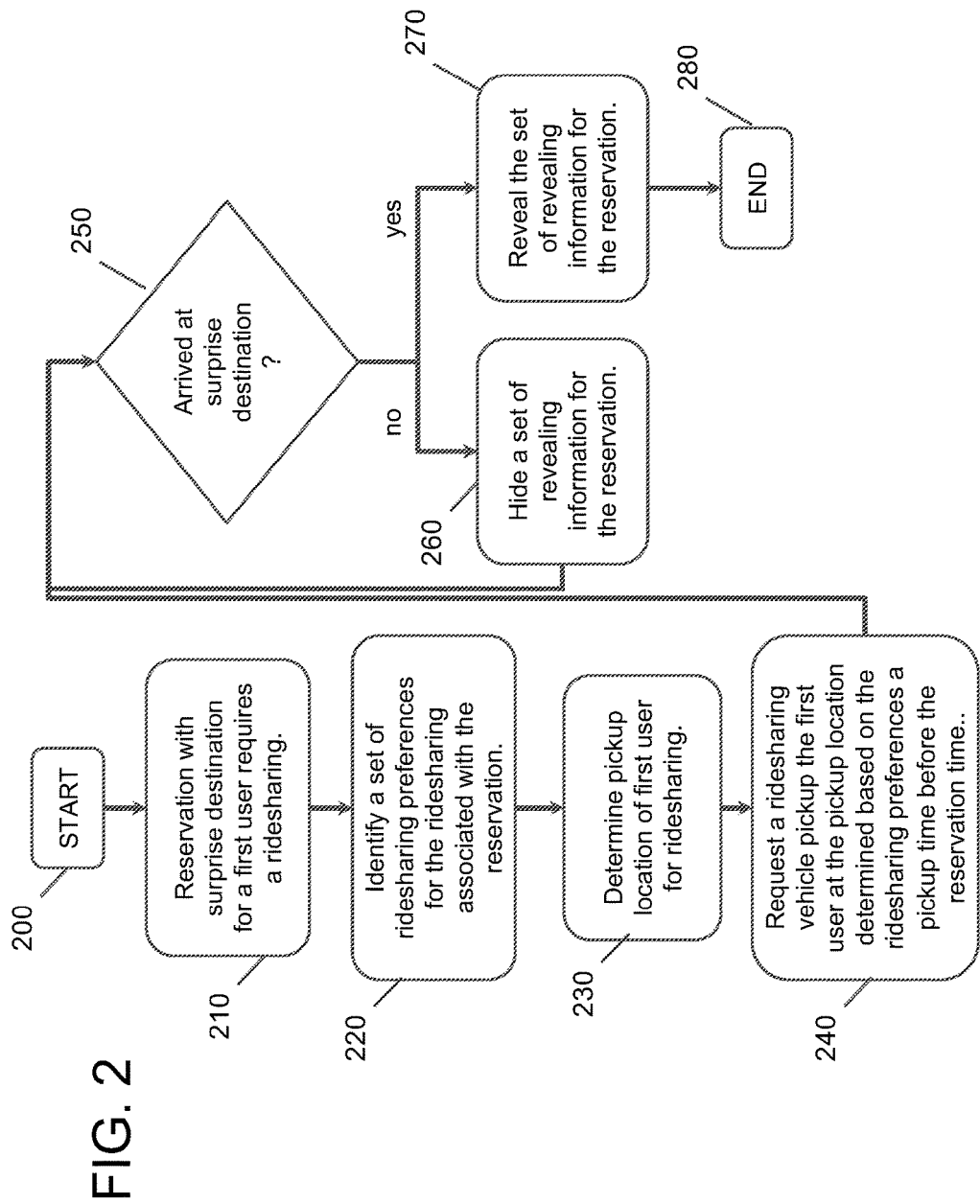
FIG. 2 is a flowchart (200) of a process taken for a ridesharing with a surprise destination based on a reservation in accordance with one embodiment.

FIG. 2 is a flowchart (200) of a process that may be taken for a ridesharing with a surprise destination based on a reservation in accordance with one embodiment. A ridesharing with a surprise destination may be required for a first user based on a reservation (210). A set of ridesharing preferences for the ridesharing may be identified for the first user (220). A pickup location associated with the set of ridesharing preferences for the first user is determined (230). A ridesharing vehicle is then requested to pickup the first user at the pickup location based on the ridesharing preferences at a pickup time before the reservation time (240). For example, the pickup time before the reservation time may be based on an estimated travel time determined by estimating travel time between the pickup location and the surprise destination and a travel preference set by the first user. For example, the first user may wish to arrive at the destination ten minutes early in case unforseen delays occur or to prepare for the reservation. In yet another aspect of the present invention, the estimated travel time is adjusted based on real time travel and weather predictions. For example, if the weather has a high chance of snow, and in previous snowy weather, travel times have increased, the pickup time will be adjusted accordingly. In yet another example, if real time travel services recognize an accident or other travel delay, the pickup time before the reservation can be adjusted accordingly or an alternative travel route may be taken by the ridesharing vehicle. The flow may continue by determining whether the ridesharing vehicle has delivered the first user to the surprise destination (250) based on the reservation. If the location of the first user does not match the surprise destination, continue to hide a set of revealing information for the reservation (260) and continue to monitor location changes (250). If the location of the first user matches the surprise destination, reveal the set of revealing information for the reservation (270). Upon determining the ridesharing vehicle has reached the surprise destination based on the reservation, the flow ends. The step of determining the ridesharing vehicle has reached the surprise destination may be done by comparing the location of the ridesharing vehicle with the location of the surprise destination based on the reservation.

As used herein, the requesting of the ridesharing with the surprise destination based on the reservation can be implemented within any type of hardware including, but not limited to, a magnetic disk, an optical disk, a semiconductor memory, a digitally encoded plastic memory, a holographic memory, or any other recording medium. Further, the ridesharing preferences for the first user can use one or more encryption mechanisms to protect stored information from unauthorized access.

Figure 3:
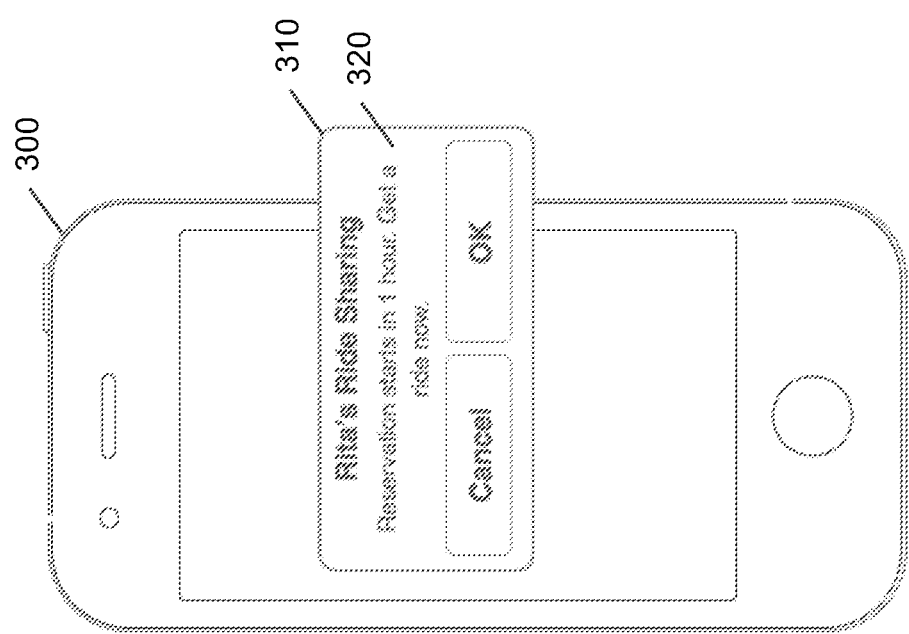
FIG. 3 is a schematic illustration of a ridesharing application (300) in which the application associated with the ridesharing provides a reminder before the pickup time in accordance with one embodiment.

FIG. 3 is a schematic illustration of a ridesharing application (300) in which the application associated with the ridesharing provides a reminder before the pickup time in accordance with one embodiment. The reminder may be in the form of a notification (310) within a ridesharing computer application, a phone call, or a notification through SMS messaging, to name a few. For example, the notification may include a message (320) reminding the first user of the upcoming reservation. In the example shown in FIG. 3, the reminder includes information about the reservation time for the upcoming reservation.

Figure 4:
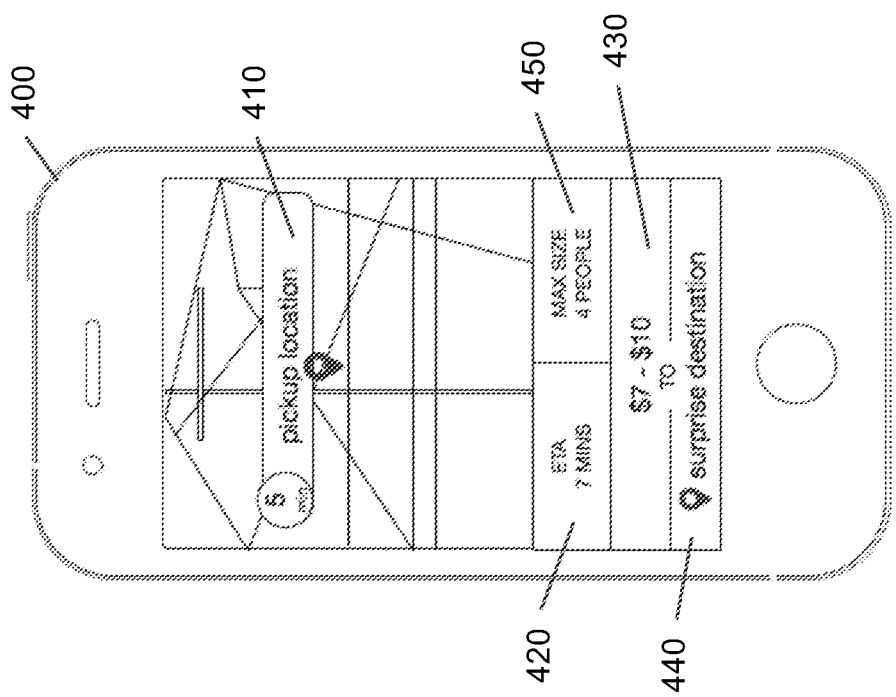
FIG. 4 is a schematic illustration of a ridesharing application (400) in which the set of ridesharing preferences for the first user is identified in accordance with one embodiment.

FIG. 4 is a schematic illustration of a ridesharing application (400) in which the set of ridesharing preferences for the first user is identified in accordance with one embodiment. The first user can identify a set of ridesharing preferences within the ridesharing application (400). For example, the first user may prefer to travel in a specific make of vehicle, model of vehicle, size of vehicle, color of vehicle, and may prefer to spend a certain amount of money on the ride (430). Additionally, the first user may have ridesharing preferences for the type of driver of the vehicle such as male vs. female, other identifying characteristics, and whether they prefer a real driver vs. a driver-less car. The first user may have additional ridesharing preferences for the vehicle such as the need for a handicap vehicle, a vehicle that can seat a number of passengers, or a vehicle with car seats for young children (450). Furthermore, the first user may set their pickup preferences (410) for the rideshare such as from a home or work address, their real time location, or a manually entered alternative location. For example, the real time pickup location may be determined using GPS technologies or cellular triangular techniques. The ridesharing application may show an estimated arrival time (420) for a ridesharing vehicle based on the entered ridesharing preferences. Additionally, the ridesharing application (400) may indicate to the first user that the destination is set to the surprise destination (440).

Figure 5:
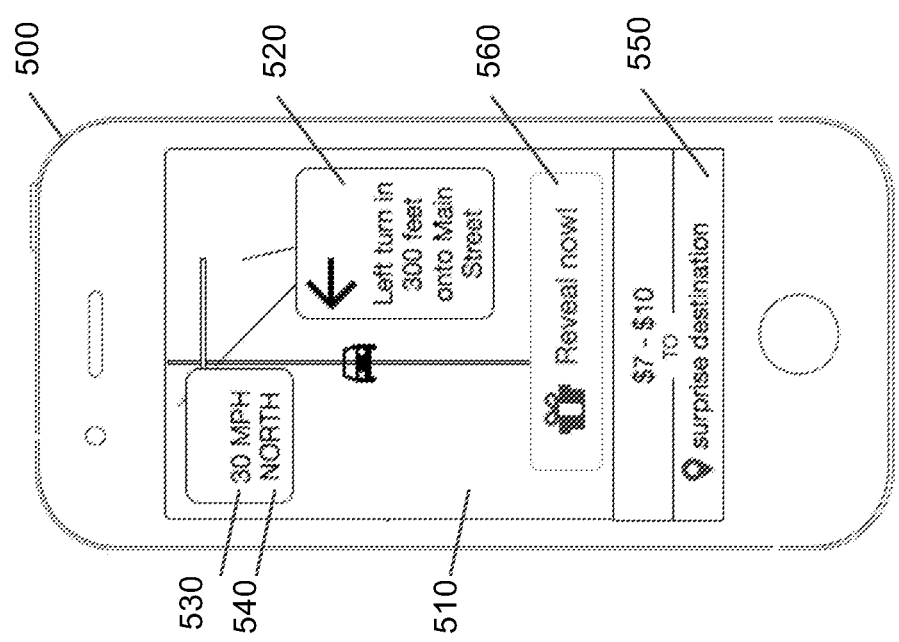
FIG. 5 is a schematic illustration of a ridesharing application (500) in which the application associated with the ridesharing hides the set of revealing information for the reservation in accordance with one embodiment.

FIG. 5 is a schematic illustration of a ridesharing application (500) in which the application associated with the ridesharing hides the set of revealing information for the reservation in accordance with one embodiment. The application may provide a user interface showing a map of the current location of the ridesharing vehicle (510) along with travel route information. Travel route information may include, but is not limited to, current speed (530), current direction (540), current street, a next turn (520), a distance until next turn, and a time until arrival. For example, the first user might see that the ridesharing vehicle should make a left turn in 300 feet onto Main Street (520) but may not see that the surprise destination (550) is located on Main Street. Furthermore, the first user may have an option to reveal the surprise destination (560). For example, suppose the ridesharing vehicle is not following the recommended travel route, if the first user feels uncomfortable at any time during the ridesharing, the first user may reveal the destination before arrival, in which case the revealing information for the reservation may be presented to the first user. In yet another embodiment, the set of revealing information may be revealed as a set of clues to the surprise destination while enroute.

Figure 6A:
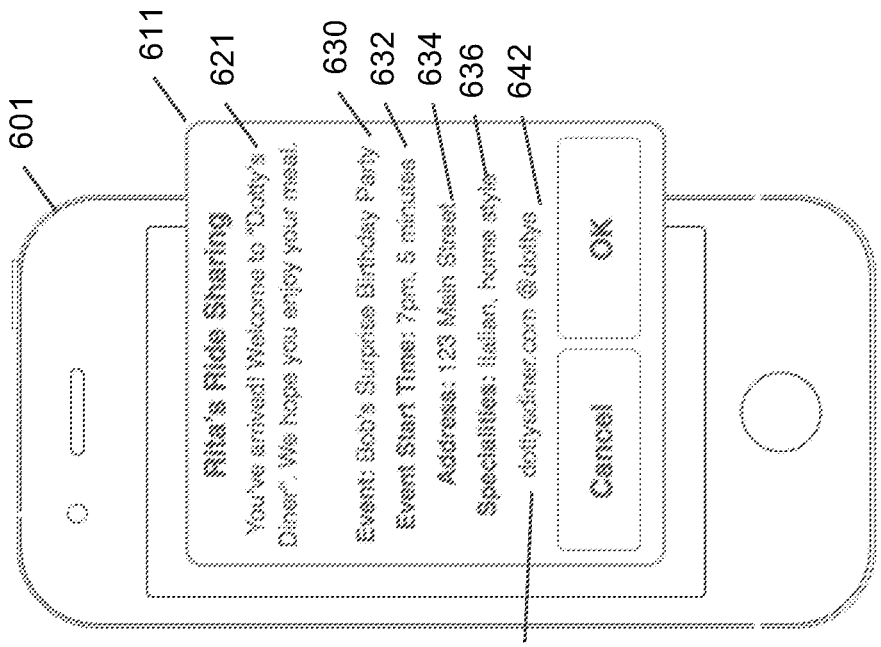
FIG. 6A and FIG. 6B are schematic illustrations of a ridesharing application (600) (601) in which the application associated with the ridesharing reveals the set of revealing information for the reservation upon arrival at the surprise destination in accordance with one embodiment.
Figure 6B:
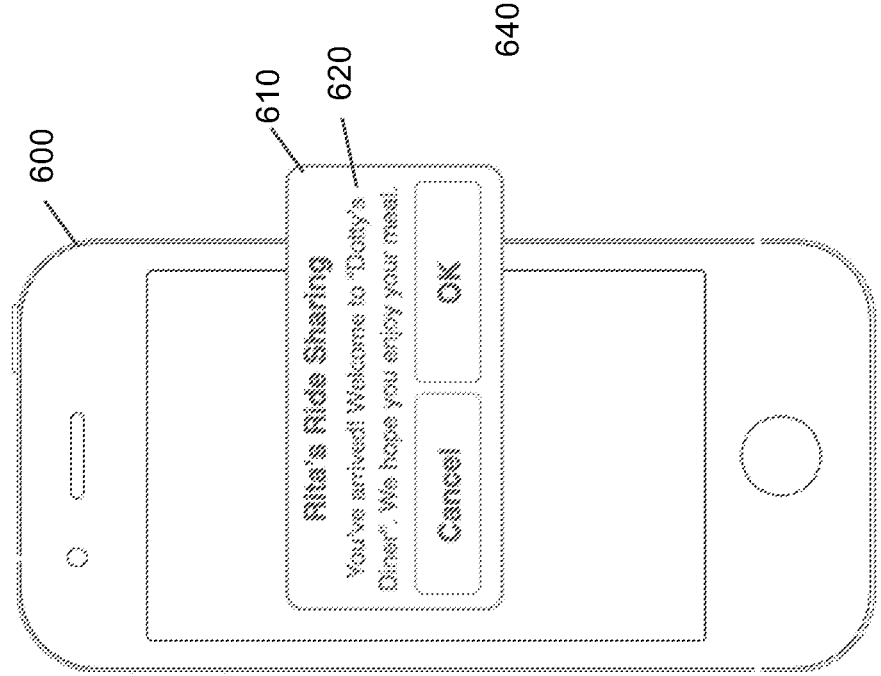

FIG. 6A and FIG. 6B are schematic illustrations of a ridesharing application (600) (601) in which the application associated with the ridesharing reveals the set of revealing information for the reservation upon arrival at the surprise destination in accordance with one embodiment. In the example, a notification is presented on the first user's mobile device (610) (611) with a message (620)(621) alerting the first user that they have arrived at "Dotty's Diner." Revealing information for the reservation may include but is not limited to: the name of the event (630), the name of the establishment, the address of the reservation (634), the phone number, the social handles for the reservation (642), the website address for the reservation (640), ratings for the surprise destination, the directions to arrive at the surprise destination, the estimated travel time to arrive at the surprise destination, and the type of establishment (636).

Figure 7:
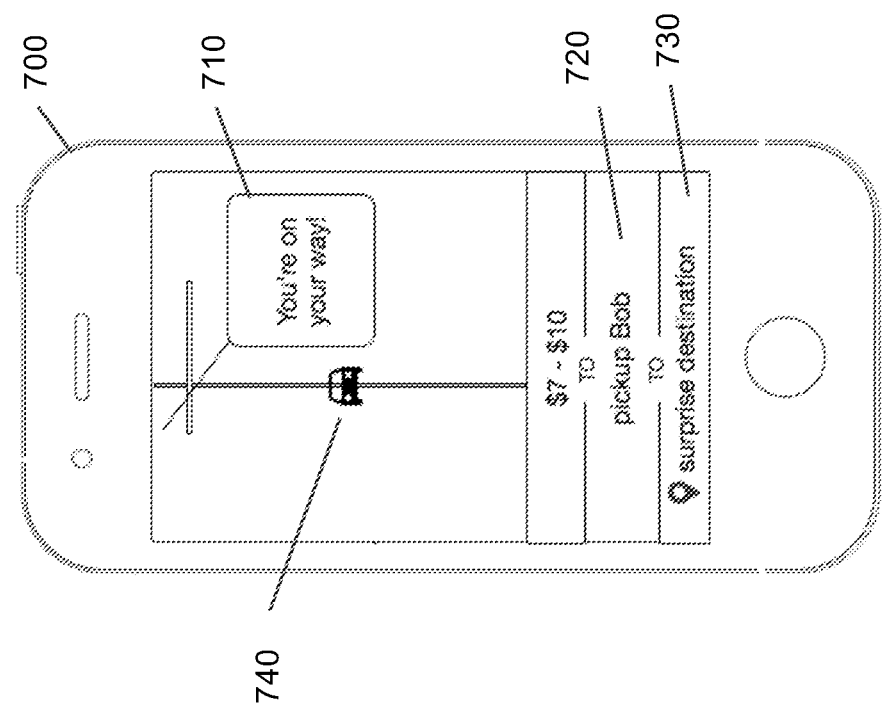
FIG. 7 is a schematic illustration of a ridesharing application (700) in which the application associated with the ridesharing provides a travel route which may include a detour to pickup a second user in accordance with one embodiment.

FIG. 7 is a schematic illustration of a ridesharing application (700) in which the application associated with the ridesharing provides a travel route which may include a detour to pickup a second user in accordance with one embodiment. When the first user is on their way to the surprise destination, the application associated with the ridesharing may provide a notification that the first user is enroute (710). The application may provide a user interface showing a map of the current location of the ridesharing vehicle (740) along with travel route information. Details about the second user (720) may be displayed within the application. For example, details about the second user may include: the name of the second user, the pickup location for the second user, the estimated time to arrive at the pickup location for the second user, and contact information for the second user. The second user may or may not be familiar with the first user. Additionally, the second user may or may not be traveling to the same destination as the first user. Furthermore, the first and second users may choose to split the cost of the ridesharing.

The diagrams in FIGS. 1-7 illustrate the architecture, functionality, and operation of possible implementations of systems, methods, and computer program products according to various embodiments of the claimed subject matter. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer implemented method for a ridesharing with a surprise destination for a passenger based on a reservation, comprising:
   determining, by one or more processors of a computer, the reservation having a reservation time and a reservation location at the surprise destination for a first passenger requiring the ridesharing;
   receiving a set of ridesharing preferences for the first passenger;
   determining a pickup location associated with the set of ridesharing preferences for the first passenger;
   scheduling a request for a ridesharing vehicle for a drop off destination of the first passenger at the reservation location at the surprise destination and a pick up of the first passenger from the pickup location a pickup time before the reservation time;
   identifying a set of revealing information for the reservation;
   obfuscating the set of revealing information for the reservation from the first passenger;
   determining the ridesharing vehicle has reached the reservation location at the surprise destination based on a location of the ridesharing vehicle matching the reservation location; and
   revealing the set of revealing information for the reservation to the first passenger upon determining the ridesharing vehicle has reached the reservation location at the surprise destination.

2. The computer implemented method of claim 1, wherein the pickup time before the reservation time is an estimated travel time determined by estimating travel time between the pickup location and the reservation location at the surprise destination and a travel preference set by the first passenger.

3. The computer implemented method of claim 2, wherein the estimated travel time is adjusted based on real time travel and weather predictions.

4. The computer implemented method of claim 1, wherein a driver of the ridesharing vehicle is instructed not to reveal the surprise destination.

5. The computer implemented method of claim 1, wherein an application associated with the ridesharing reveals the set of revealing information for the reservation gradually as a set of clues while enroute to the reservation location at the surprise destination based on the reservation.

6. The computer implemented method of claim 1, wherein an application associated with the ridesharing provides a reminder before the pickup time.

7. The computer implemented method of claim 1, wherein the pickup location is determined using GPS.

8. The computer implemented method of claim 1, wherein a travel route for the ridesharing vehicle traveling from the pickup location to the reservation location at the surprise destination includes a detour to pick up a second passenger.

9. A computer program product imbedded in a non-transitory
computer readable storage medium readable by one or more processor and storing instructions for execution by the one or more processor for performing a method for a ridesharing with a surprise destination for a passenger based on a reservation, comprising:
determining, by one or more processors of a computer, the reservation having a reservation time and a reservation location at the surprise destination for a first passenger requiring the ridesharing;
receiving a set of ridesharing preferences for the first passenger;
determining a pickup location associated with the set of ridesharing preferences for the first passenger;
scheduling a request for a ridesharing vehicle for a drop off destination of the first passenger at the reservation location at the surprise destination and a pick up of the first passenger from the pickup location a pickup time before the reservation time;
identifying a set of revealing information for the reservation;
obfuscating the set of revealing information for the reservation from the first passenger;
determining the ridesharing vehicle has reached the reservation location at the surprise destination based on a location of the ridesharing vehicle matching the reservation location; and
revealing the set of revealing information for the reservation to the first passenger upon determining the ridesharing vehicle has reached the reservation location at the surprise destination.

10. The computer program product of claim 9, wherein the pickup time before the reservation time is an estimated travel time determined by estimating travel time between the pickup location and the reservation location at the surprise destination and a travel preference set by the first passenger.

11. The computer program product of claim 10, wherein the estimated travel time is adjusted based on real time travel and weather predictions.

12. The computer program product of claim 9, wherein a driver of the ridesharing vehicle is instructed not to reveal the surprise destination.

13. The computer program product of claim 9, wherein an application associated with the ridesharing reveals the set of revealing information for the reservation gradually as a set of clues while enroute to the reservation location at the surprise destination based on the reservation.

14. The computer program product of claim 9, wherein an application associated with the ridesharing provides a reminder before the pickup time.

15. The computer program product of claim 9, wherein the pickup location is determined using GPS.

16. The computer program product of claim 9, wherein a travel route for the ridesharing vehicle traveling from the pickup location to the reservation location at the surprise destination includes a detour to pick up a second passenger.

17. A system comprising:
a memory;
one or more processors in communication with memory; and
program instructions executable by the one or more processors via the memory to perform a method for a ridesharing with a surprise destination for a passenger based on a reservation, comprising:
determining, by one or more processors of a computer, the reservation having a reservation time and a reservation location at the surprise destination for a first passenger requiring the ridesharing;
receiving a set of ridesharing preferences for the first passenger;
determining a pickup location associated with the set of ridesharing preferences for the first passenger;
scheduling a request for a ridesharing vehicle for a drop off destination of the first passenger at the reservation location at the surprise destination and a pick up of the first passenger from the pickup location a pickup time before the reservation time;
identifying a set of revealing information for the reservation;
obfuscating the set of revealing information for the reservation from the first passenger;
determining the ridesharing vehicle has reached the reservation location at the surprise destination based on a location of the ridesharing vehicle matching the reservation location; and
revealing the set of revealing information for the reservation to the first passenger upon determining the ridesharing vehicle has reached the reservation location at the surprise destination.

18. The system of claim 17, wherein the pickup time before the reservation time is an estimated travel time determined by estimating travel time between the pickup location and the reservation location at the surprise destination and a travel preference set by the first passenger.

* * * * *